United States Patent Office 3,448,731
Patented June 10, 1969

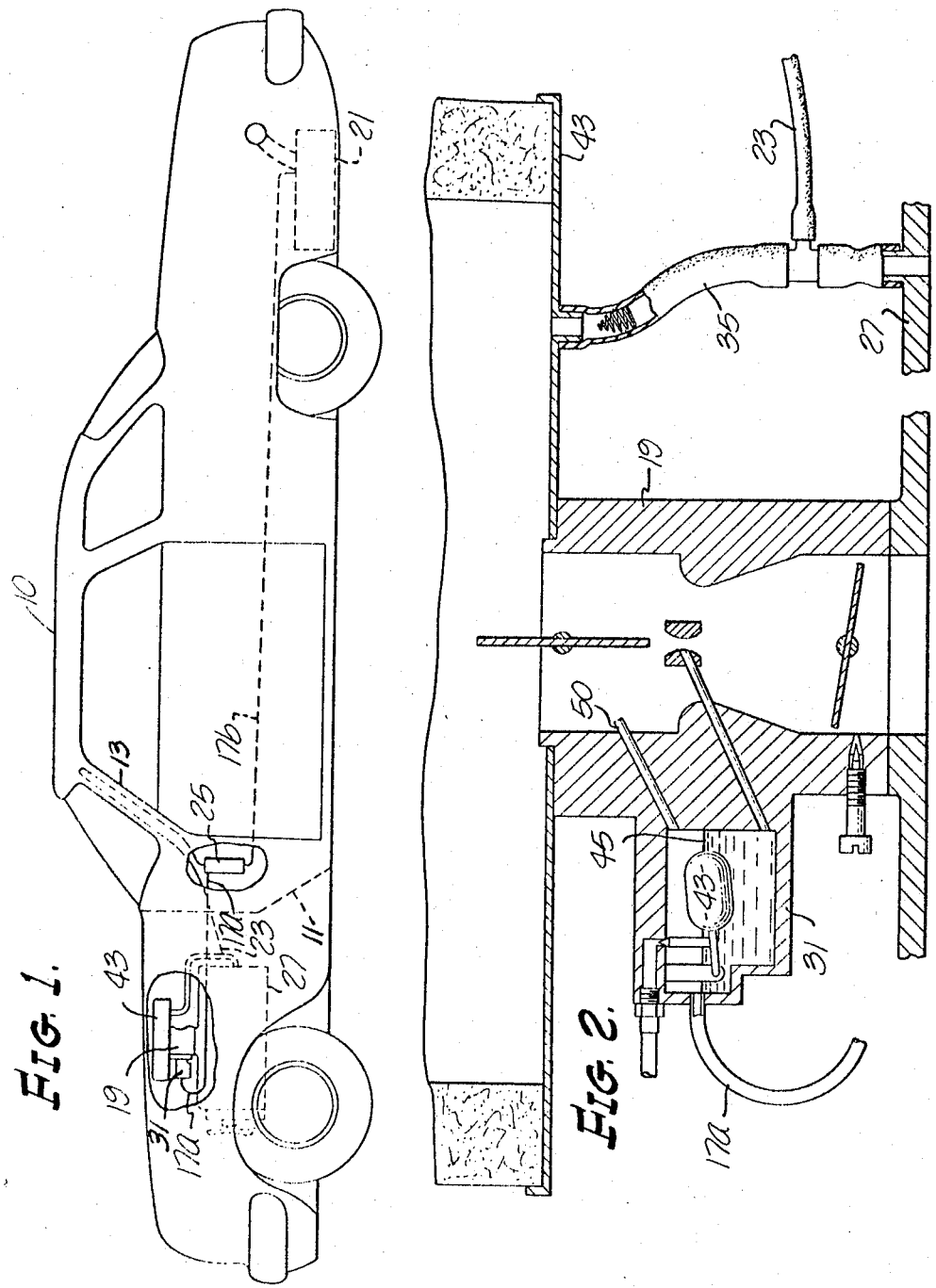

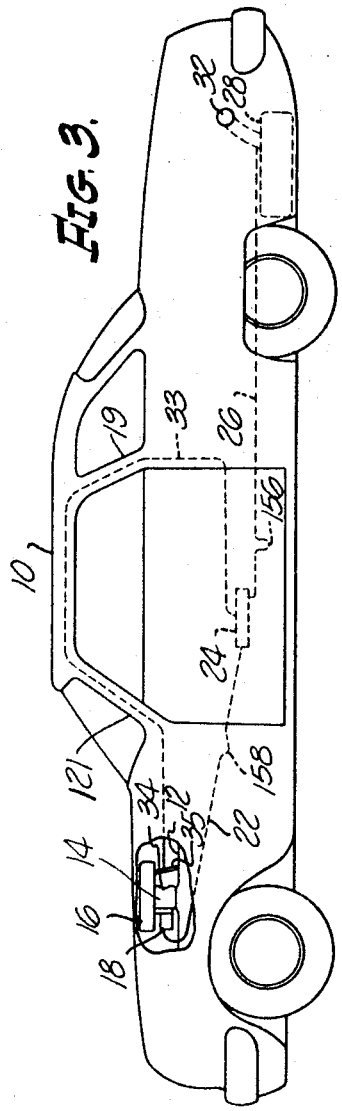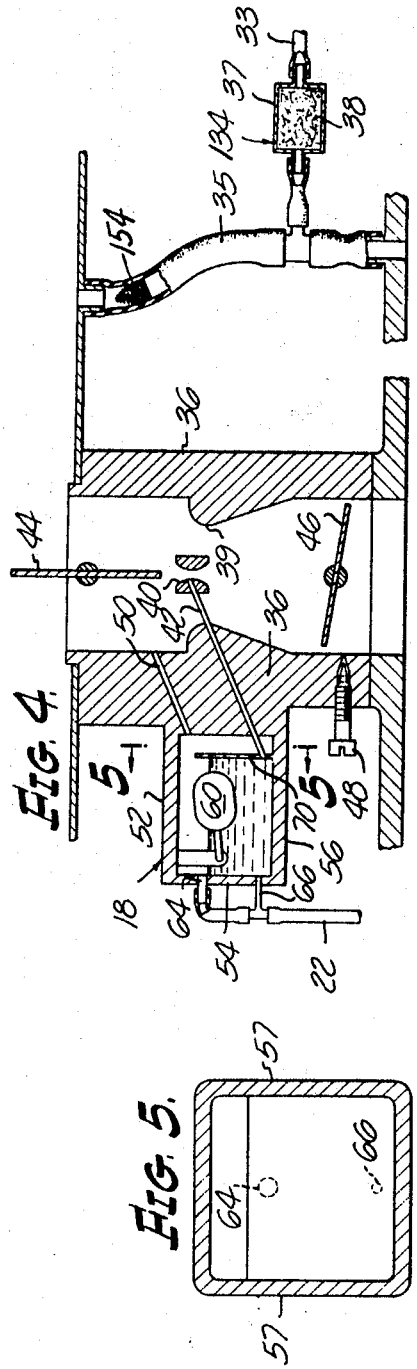

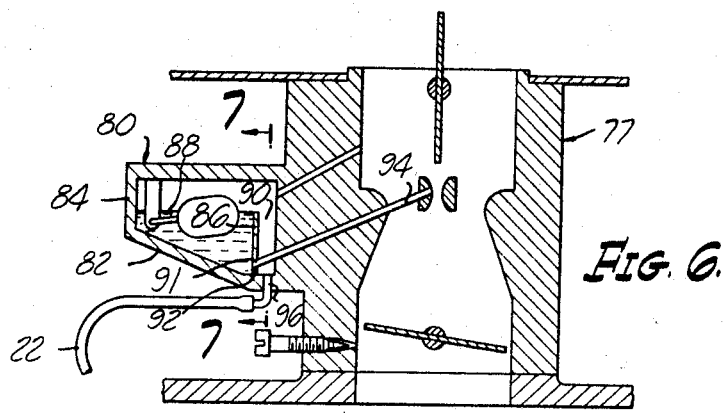
FIG. 6.
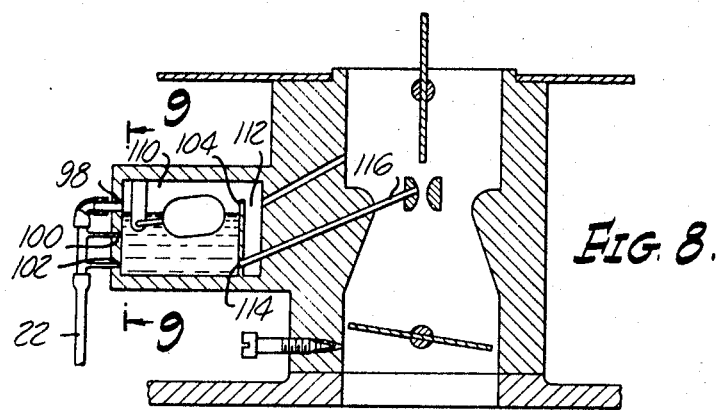
FIG. 8.
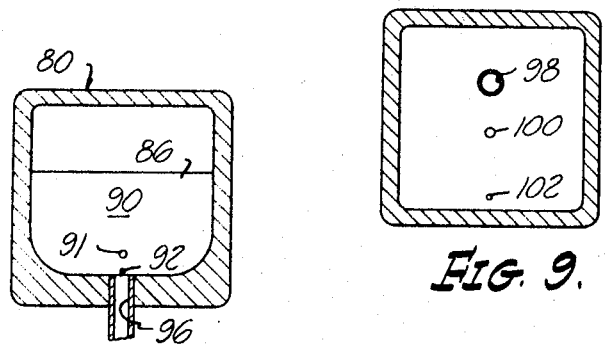
FIG. 7.
FIG. 9.
INVENTOR
HAROLD D. DAIGH
BY
ATTORNEY

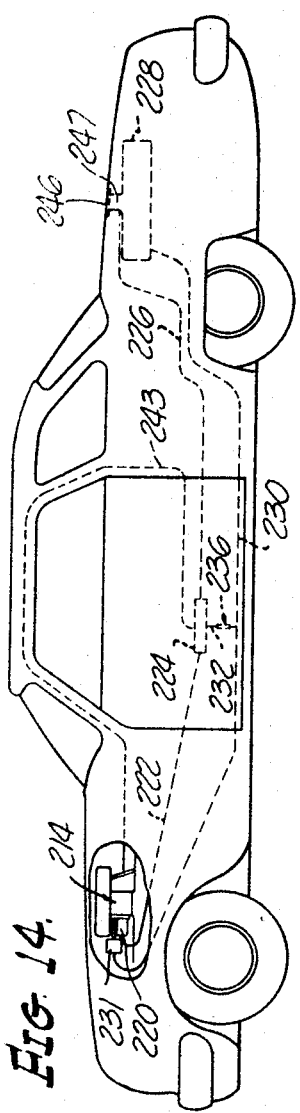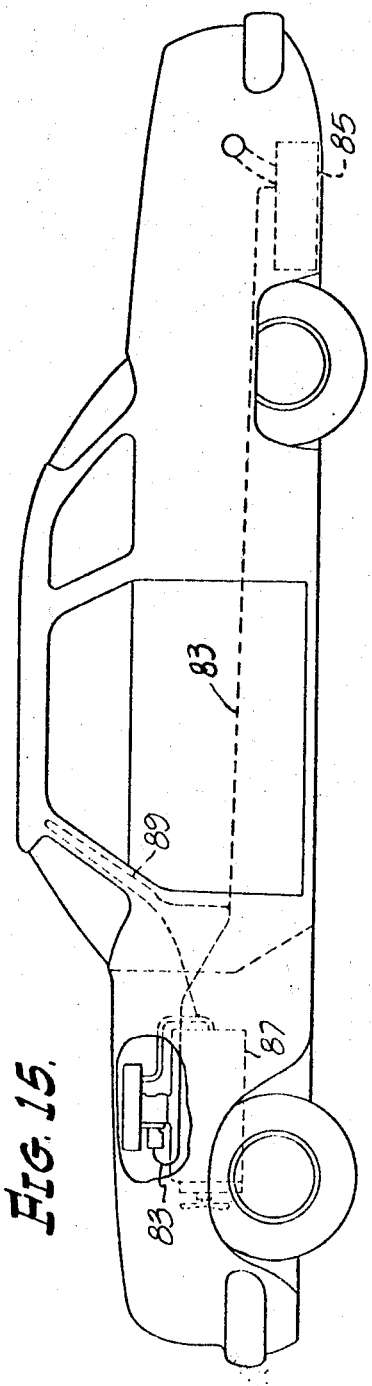

3,448,731
VEHICLE VAPOR RECOVERY SYSTEM
Harold D. Daigh, Rolling Hills Estates, Calif., assignor to Atlantic Richfield Company, Philadelphia, Pa., a corporation of Pennsylvania
Continuation-in-part of applications Ser. No. 579,990, Sept. 16, 1966; Ser. No. 615,990, Feb. 14, 1967, and Ser. No. 636,973, May 8, 1967. This application Mar. 25, 1968, Ser. No. 715,811
Int. Cl. F02m 7/10, 35/04
U.S. Cl. 123—136                    25 Claims

ABSTRACT OF THE DISCLOSURE

This invention pertains to a vehicle vapor recovery system for an internal combustion engine having a fuel system wherein a conduit is provided between the carburetor and the fuel tank for recovering fuel vapors. A condenser may be positioned in the conduit at a relatively cool location to facilitate condensation of vapors removed from the carburetor and/or the fuel tank. The condenser is vented into the crankcase and positioned below the carburetor but above the fuel tank to permit gravity flow of fuel between the carburetor and condenser and between the condenser and the fuel tank. An adsorptive filter may be provided in the condenser vent line to remove uncondensible hydrocarbons and the filter desorbed periodically with air drawn through a one-way vent valve. Means are also provided for partially draining the carburetor float bowl during the hot soak period to minimize evaporative fuel losses. The fuel vapors are withdrawn from the float bowl at the skim line and carburetor modifications are disclosed to minimize the heating of fuel in the carburetor float bowl.

---

This application is a continuation-in-part of applications Ser. No. 579,990, filed Sept. 16, 1966; Ser. No. 615,990, filed Feb. 14, 1967; Ser. No. 636,973, filed May 8, 1967; and Ser. No. 636,975 filed May 8, 1967, all now abandoned.

My present invention relates to a vapor control system for four cycle internal combustion engine driven vehicles and more specifically relates to an evaporative emission control system which reduces carburetor and fuel tank vapor emissions from the vehicle into the atmosphere.

Much attention has been given in the past to the control of air pollution by the prevention of fumes escaping from internal combustion engine driven vehicles into the atmosphere, principally from the crankcase and exhaust system. Blowby or crankcase fumes are controlled by recycling into the induction system as shown by my U.S. Patents Nos. 3,077,871, 3,123,060, 3,157,467, 3,237,616 and 3,237,617. Several proposals have been made for the prevention of air pollution by engine exhaust products, for example, air injection systems which inject air into the exhaust manifold to support combustion of unburned hydrocarbons in the exhaust gas leaving the engine and exhaust recycle systems for recycling the combustion products into the induction system, as for example, the system shown in my U.S. Patent No. 3,237,615 dated Mar. 1, 1965, for "Exhaust Recycle System."

The fuel loss to the atmosphere by evaporation from the carburetor, the fuel tank and through the various fuel system vents is not controlled by these systems, however, the light hydrocarbons in the fuel evaporating from the carburetor may in part be lost through the carburetor air cleaner and external carburetor openings. The vapors from the fuel tank are normally lost through the tank vents or cap.

It is therefore a prime object of my present invention to provide a system for recovering fuel vapors from an automotive fuel system which may otherwise be lost to the atmosphere.

It is a further object of my present invention to provide a system for internally venting fuel vapors escaping from an automotive fuel system.

It is also a principal object of my present invention to provide an apparatus for condensing and/or recovering fuel vapors from a fuel system of an internal combustion engine powered vehicle.

Certain light hydrocarbon components of automotive fuels are not readily condensible at the condensing temperatures available in fuel vapor recovery systems.

Accordingly, a further object of my present invention is to provide apparatus for recovering fuel vapors in a closed vent fuel system including means for adsorbing noncondensible lightweight hydrocarbon vapors in said fuel system.

One source of air pollution from internal combustion engine driven vehicles is the evaporative emission of fuel from the carburetor float chamber during soak, i.e. when the engine is not running. The carburetor float chamber of an average size automobile holds approximately from 80 to 200 ml. of fuel, which during high temperature soak, evaporates rapidly and even at normal temperatures is partially evaporated due to the high volatility of liquid fuels. The fuel temperature in the float chamber is increased during operation of the engine by thermal conduction primarily through the motor block into the side walls of the carburetor. During operation of the engine, the fuel vapors so generated are normally drawn into the engine induction system. Thus, while an increase in the temperature of the fuel in the float chamber during engine operation does not ordinarily increase the vapor emissions into the atmosphere, during periods of soak some of these vapors pass from the carburetor vents into the atmosphere. The cumulative effect of evaporative losses to the atmosphere from the carburetors of the many internal combustion vehicles in use is believed to be a significant factor in air pollution.

Accordingly, another object of this invention is to provide a vapor recovery system for preventing escape of evaporative emissions from the fuel tank and carburetor of an internal combustion engine into the atmosphere.

Still another object of this invention is to provide a means for removing fuel from the float chamber of the carburetor of an internal combustion engine during periods of soak.

Another object of this invention is to provide a vapor recovery system for an internal combustion engine driven vehicle which includes means for removing liquid from the carburetor float chamber during periods of soak thereby preventing evaporative loss of said liquids into the atmosphere and further includes means for preventing fluid flow through the vapor recovery system from the fuel tank of the vehicle to the carburetor float chamber.

Another object of this invention is to provide means for reducing the thermal effect of the side wall of the carburetor of an internal combustion engine on the fuel in the carburetor float chamber.

A further object of my invention is to provide in an automotive vapor recovery system, a means for removing vapors and liquids from a carburetor bowl at the skimming line to prevent the liquid level from rising in the carburetor bowl or float chamber due to heat expansion, boiling, and percolation of the fuel, or a mechanical malfunction which may tend to cause the level to rise.

Prior systems for controlling evaporative fuel losses have returned the fuel vapors to the fuel tank. The most practical embodiments of those systems require that the fuel tank be at a lower position on the vehicle than the carburetor. These systems have not been effective on vehicles which have the fuel tank mounted at a higher level than the carburetor without a pump for returning condensate from the condenser to the fuel tank.

Accordingly, it is an object of this invention to provide a practical means for reducing air pollution caused by the evaporative losses of fuel from the carburetor of an internal combustion engine powered vehicle having the fuel tank mounted at a higher level than the carburetor.

Another object of this invention is to provide a system for returning condensed fuel vapors to an automotive fuel system of a vehicle having the fuel tank mounted at a higher level than the carburetor.

These and other objects of this invention will become more apparent from the specification and appended claims when taken in conjunction with the following drawings wherein:

FIGURE 1 is a side elevation, partially in section, of an internal combustion driven vehicle utilizing a form of the vapor recovery system of my present invention;

FIGURE 2 is an enlarged view, partially in section, of the carburetor and float chamber of FIGURE 1;

FIGURE 3 is a side elevation, partially in section, of an internal combustion engine utilizing another form of the vapor recovery system of my present invention;

FIGURE 4 is an enlarged view, partially in section, of a carburetor float chamber of a modified form of my present invention;

FIGURE 5 is a transverse sectional view through the carburetor float chamber of FIGURE 4 taken substantially along line 5—5;

FIGURE 6 is an enlarged sectional view of a modification of the carburetor and float chamber, shown in FIG. 4;

FIGURE 7 is a transverse sectional view of the float chamber of FIGURE 6 taken substantially along line 7—7;

FIGURE 8 is a sectional view of another modification of the carburetor shown in FIGURE 4;

FIGURE 9 is a transverse sectional view of the float chamber of the carburetor of FIGURE 8 taken substantially along line 9—9;

FIGURE 14 is a side elevation of an internal combustion driven vehicle partially cut away to show another embodiment of the system of this invention; and FIGURE 15 is a side elevation of a vehicle embodying another form of my present invention.

Figure 10:
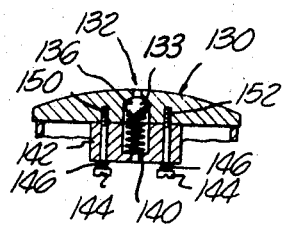
FIGURE 10 is a sectional view of a one-way valved fuel tank cap for use with one of the systems of this invention.

Briefly, my invention may be described with reference to FIG. 1, as an apparatus for recovery of gasoline vapors in a fuel system having all external vents plugged, wherein a vapor recovery line, comprising line 17a connected to the carburetor 19 and line 17b which is connected to the fuel tank 21, is provided so that fuel vapors escaping the carburetor 19 and the fuel tank 21 are retained or vented internally. The vapor recovery lines are vented to the crankcase through vent line 23. A receptacle or condenser vessel 25 may be provided in the vapor recovery line in an appropriate location below the carburetor wherein vapors may be condensed and the condensate drained back to the fuel tank 21. The condenser 25 may also be appropriately vented through vent line 23 as will be described hereinbelow. FIGURES 4 through 9 show a modified form of my present invention for reducing evaporative losses from the carburetor float chamber to the atmosphere by condensing fuel vapors and returning the condensed liquids to the fuel tank, which involves reducing the thermal effect of the carburetor side walls and the liquid fuel temperature, by reducing the liquid fuel available for evaporation to the atmosphere during hot soak, and by providing means for adsorbing uncondensed vapors from the recycle system. FIGURE 14 shows a system for recovering fuel vapors in an automotive fuel system where the fuel tank 228 is positioned higher than the carburetor 214, and FIGURE 15 shows a form of my present vapor recovery system without a condenser receptacle whereby the escaping vapors are vented into the crankcase 87.

FIGURE 1 generally shows a vehicle 10 having the carburetor vapor recovery system of this invention mounted thereon. The larger cut away portion of FIGURE 1 shows diagrammatically a motor crankcase 27 having a carburetor 19 mounted thereon subjacent an air cleaner 43. Carburetor 19 includes an integrally connected float chamber 31 on a side wall thereof. A section 17a of the vapor recovery line runs from the float chamber 31 to a condenser receptacle 25, and a liquid return line section 17b connected to a lower wall thereof is in fluid communication with the fuel tank 21. Fuel tank 21 is disposed at a lower level than condenser 25 so that any condensed liquids may drain by gravity back into the fuel tank. Vapor recovery lines 17a and 17b may be made of copper tubing or tubing of other flexible, resistant materials such as vinyl plastics of fluorocarbon resins.

Gasoline fumes and vapors drawn off at the float chamber 31 through line 17a are passed into a condenser 25 (shown in FIGURE 1) where the vapors may be condensed and the condensate returned by gravity flow to fuel tank 21. The condenser 25 may be any suitably shaped receptacle with a condensate drain line 17b proximate the bottom thereof so that liquids condensing in condenser 25 may return through line 17b to the fuel tank 21. Preferably, the carburetor vent line 17a is connected to the upper portion of the condenser 25. While container 25 is called herein, a condenser, since vapors from the carburetor may condense therein if a sufficient gradient temperature exists, container 25 is also a fuel vapor receptacle for the fuel tank vapors and may also function as a liquid-vapor separator when both liquid fuel and fuel vapors exist together in the lines 17a and 17b between the carburetor and the fuel tank and the vent line 23.

The receptacle 25 may be of sufficient capacity to serve as an expansion chamber and accept fuel which might be forced out of a full fuel tank by expansion during a soak period or an unusual parking attitude.

The condenser 25 is installed where it can be cooled or adjacent an area within the automobile which is relatively cool such as the passenger area of the car. At least one surface of the condenser should be in thermal communication with a cooling source so that cooling of the condensers can be effected by conduction, convection or radiation. The condenser is preferably insulated from heat sources. Preferred locations for the condenser are near the firewall 11 (as shown in FIG. 1) or over the chassis tunnel under the seat (as shown in FIG. 3) at such vertical height that vapors from the carburetor may drain by gravity to the condenser and liquids condensed in the condenser may drain from the condenser to the fuel tank by gravity flow. The condenser receptacle is preferably insulated or shielded from the heat of the engine and the exhaust system so that it is at a temperature not substantially warmer than ambient. The temperature gradient during the hot soak period will normally be on the order of about 50° F. or more between the carburetor bowl and the condenser, which is a sufficient gradient to effect some condensation of fuel vapors. Generally, the cooling sought in the condenser need only be to about 110 to 120° F. to effect this gradient. Supplemental cooling can be provided for the condenser to effect condensation, by subjecting the condenser to the cooling action of the automobile air conditioner or any suitable cooling means. In order to observe safety precautions, especially where the condenser is located in or adjacent the passenger compartment, the condenser and the lines leading thereto, should be protected from physical damages, for example by suitably encasing the condenser and its lines.

All external vents on the carburetor and the fuel tank are closed and a nonventing cap used on the fuel tank fill pipe. Preferably a combination vacuum-pressure release cap of proper pressure range is desirable as a safety feature for protection during unusual atmospheric and operating conditions.

As shown in FIG. 2, vapor return line 17a removes fuel vapors from the carburetor bowl 31 at the skim line 45. Fuel vapors in the carburetor bowl vapor space tend to pass through the vapor recovery lines 17a rather than to the internal bowl vent line 50 which could otherwise possibly result in over enrichment of the air-fuel mixture or loss of vapors to the atmosphere through the air cleaner. The gasoline vapors flow through skim line 17a rather than vent 50 since 17a is lower than 50 and line 17a is connected to the crankcase and thus during hot soak as the crankcase cools and the temperature of the carburetor bowl rises, a negative pressure is placed on the vapor recovery system and gasoline vapors are drawn into the crankcase. The vapor recovery line 17a being at the skim line or the liquid level of the carburetor bowl also permits drainage of the carburetor into the condenser should any rise in the liquid level above the desired liquid level occur, as far example, when percolation or boiling in the carburetor occurs due to a heat rise, cornering, or any occurrence which would raise the fuel level in the float bowl above the desired level. The fuel and vapor mixture drained from the carburetor separates in the condenser receptacle 25, and the liquid returns to the fuel tank through line 17b.

FIGURE 15 shows a modified form of my present invention wherein a vapor recovery line 83 is attached to the carburetor bowl at the skim line (similar to the showing of FIG. 2). The line is attached to the fuel tank 85 directly. This form of my invention is utilized where condensation is not practical and hence any liquid fuel removed from the carburetor float bowl is returned through line 83 directly to the fuel tank 85. As the fuel level in the float chamber 18 rises, the buoyancy of the float causes the float linkage to shut off the fuel pump and as the fuel level drops the float 60 drops and in so doing starts the fuel pump to pump fuel into the float bowl 18. The vapor recovery line 83 may advantageously be vented into the crankcase 87 (or crankcase ventilating system) with vent line 89 running up along the front windshield post in the manner described with respect to FIG. 1.

Referring again to FIG. 1, the condenser 25 may be appropriately vented as through condenser vent line 23 into the crankcase 27 or crankcase ventilation system. Preferably, vent line 23 is connected to the upper portion of the condenser and has a relatively long vertical path so that any vapors exiting the condenser which may subsequently condense can flow back into the condenser. As shown in FIGURE 1, the condenser vent line runs upward along the front post 13. Alternatively, as shown in FIG. 3, the vent line may run up through the rear post 19, along the roof of the vehicle, down through the front post 121 through a carbon trap 134 (FIG. 4) and into the fresh air line 35 of the crankcase ventilation system.

Preferably, condenser vent line 23 is connected to the crankcase or any part of the crankcase ventilation system. In the preferred form the condenser vent line 23 is connected to the fresh air line 35 (FIG. 2) between the crankcase 27 and the air cleaner 43, in a system wherein the crankcase recycle mechanism (not shown) is employed and air from the air cleaner 43 is drawn into the crankcase and the crankcase subjected, at least to some extent, to the induction system vacuum through a suitable recycle valve as is shown in FIGURE 1 of my U.S. Patent No. 3,237,617. The slight vacuum on the crankcase would thus impose a slight vacuum on the vent line 23. In systems not employing a crankcase recycle mechanism, the condenser vent line 23 may be connected to the clean side of the air cleaner directly, and thereby subjected to the relatively low air cleaner vacuum.

In a form of my invention shown in FIG. 4, a carbon trap 134 is included in line 33 near fresh air line 35, as shown in FIGURE 4, to adsorb excess light hydrocarbon gases from the fuel vapors. Under certain conditions, such as high speed, long distance driving or long standing hot soak condition, unusually high evaporative emissions are generated from the fuel tank, carburetor and crankcase. If these excessive vapor emissions are not removed before recycling into the carburetor, they may be released into the atmosphere as increased emissions of unburned hydrocarbons. The adsorbed excess hydrocarbons are desorbed, as will be explained, by passage of air or leaner hydrocarbon-air mixtures through the trap. Thus, the trap is reconditioned by the system to reduce the quantity of hydrocarbon gases in the recycle vapors below undesirably excessive levels.

The trap may be mounted in line 33, as shown in FIGURE 4. It comprises a cannister, such as cannister 37, filled with adsorbent material 38. It has been found that activated charcoal type 464 having an 8x14 mesh of 60 minute coconut shell charcoal and bulk density of 31 lbs./cu. ft. is most satisfactory because of its high adsorption capacity. This type charcoal adsorbent has a hardness of 95 (ball abrasion test) and a packed moisture content of 5 percent maximum. Other materials which can be used as adsorbents include other activated charcoals, carbon, silica, activated alumina, gels such as silica gel, titania gel, zirconia gel and alumina gel, florisil, molecular sieves, various natural occurring or processed clays such as attapulgus and any other materials which have a good adsorption capacity for lightweight hydrocarbons. Best results are obtained by using these adsorbent materials in a form having a high surface area such as pellets or granules in the cannister.

A closed non-vented cap 32 may be provided on fuel tank 28 (FIG. 3) for preventing vapor emission from the fuel tank into the atmosphere. The cap may include a one-way valve therein as will be discussed.

FIGURE 4 is an enlarged view of carburetor 14 modified according to one embodiment of my invention. Carburetor 14 comprises a substantially cylindrical side wall or barrel 36 enclosing the throttle body and reduced diameter throat portion 39 which has a carburetor venturi 40 mounted therein. Venturi 40 is in fluid communication with the fuel in float chamber 18 through fuel line 42 for drawing liquid fuel into the carburetor. A choke butterfly valve 44 is rotatably mounted in the upper end of the carburetor barrel and is shown in its open position. A throttle butterfly valve 46 for controlling the flow of the fuel-air combustion mixture into the induction system is rotatably mounted in the lower end of the barrel beneath venturi 40. A conventional idle adjustment needle 48 for regulating the idling speed of the engine is threadedly mounted through the carburetor side wall. An internal vent 50 connects the upper vapor space of float chamber 18 with the carburetor barrel above venturi 40.

Float chamber 18, as shown in FIGURE 4, comprises a compartment having an upper wall 52, an outer wall 54, a lower wall 56, a common wall 36 with the carburetor and a pair of side walls 57 (see FIGURE 5). A float bulb 60 for actuating a fuel pump which is connected to fuel tank 28 by a conventional fuel line (not shown) and maintaining the proper fuel level in the carburetor is pivotally mounted on a depending bracket fixed to upper wall 52. An upper relatively large diameter skimming outlet 64 is provided through outer wall 54 of the float chamber for maintaining the proper level of liquids in the float chamber and for venting vapors from the float chamber to condenser 24. Outlet 64 is in fluid communication with line 22, which is also connected to a small diameter outlet 66 in the lower portion of outer side wall 54 adjacent lower wall 56 of the carburetor float chamber. The capacity of outlet 66 is relatively small in comparison with that of outlet 64 and the fuel pump. Although some liquid is always being recirculated through line 66 from the float chamber through condenser 24 back to fuel tank 28 when the engine is running, the fuel pump due to its greater capacity maintains the proper level of fuel in the float chamber and it is not completely drained through outlet 66. When the fuel pump has stopped pumping, i.e. when the engine is not running, the liquid in float chamber 18 drains slowly through outlet 66 back into condenser 24 and through line 26 into fuel tank 28 (FIG. 3). Thus, during soak the float chamber is reduced in content of liquid fuel which ordinarily would contribute to air pollution by evaporation into the atmosphere. The float chamber may be completely emptied or only partially emptied depending upon the vertical spacing of outlet 60 from bottom wall 56. It has been found preferable to leave about one-third of the fuel in the chamber so that fuel can be fed through the venturi feed line 42 during start-up, thus permitting engine start-up prior to filling the bowl 18 by the fuel pump. The end of feed line 42 is below the outlet 66.

According to the embodiment of my invention, shown in FIGURE 4, a spacer member 70 may be mounted within float chamber 18 in spaced relation with wall 36 of the carburetor. Spacer member 70 substantially isolates the liquid within float chamber 18 from the side wall of the carburetor. Spacer member 70 may be made from any relatively non-conductive material such as ceramic, glass, or metals which may be welded in place within the float chamber or be an integral part of the casting. Thus, all but the lower portions of the liquid in float chamber 18 are substantially isolated from thermal conduction from the carburetor side walls. When the engine is stopped, the lower portions of the liquid in the float chamber are the first to drain off through outlet 66, thus reducing substantially the effect of the hot carburetor side walls on the total heat adsorption of the liquid fuel.

With reference now to FIGURE 6, a modified carburetor float chamber for use in the system of this invention is shown. This carburetor comprises basically, a conventional carburetor body 77 and a modified float chamber 80. Carburetor body 77 is identical with that of FIGURE 4. The float chamber is provided with an upwardly and outwardly inclined lower wall 82 and a solid outer wall 84. A solid, rectangular, plate-like spacer member 86 completely divides the float chamber into two compartments 88 and 90. Compartment 90 is provided with an outlet drain hole 96 in its lower wall for receiving the upper end of the vent line 22 (of FIGURE 3). Line 22 may be mounted in drain hole 96 by any convenient means. For example, drain hole 96 may be threaded internally for receiving a threaded fitting connected to line 22.

Spacer member 86, as shown in FIGURE 7, has two vertically spaced through-apertures 91 and 92. Aperture 91 receives a fuel line 94 which passes through the side wall of the carburetor and through compartment 90 as shown in FIGURE 6. Aperture 92 is a small diameter, low-capacity outlet for draining fuel from chamber 88 into chamber 90 and through drain hole 96. While the engine is running, the fuel pump compensates for the slow leakage of fuel from compartment 88 to maintain a constant fuel level therein. During soak, however, substantially all of the fuel will drain from compartment 88 into compartment 90 and through drain hole 96, conduit 22, condenser 24, and line 26 back into the fuel tank.

Normally, the fuel level of the float chamber is maintained below the upper edge of spacer member 86. If excess fuel is present in chamber 88, however, it overflows from chamber 88 into chamber 90 and is returned to fuel tank 28 through conduit 22. Thus, the spacer member 86 in this embodiment of the invention serves to both separate the fuel in compartment 88 from direct contact with the side wall of the carburetor and to act as a skimmer for removing excess fuel from the float chamber. Member 86 may be constructed from a nonconductive material such as glass or ceramic and appropriately fitted into the float chamber or it may be constructed from a metal and welded into position. The space in compartment 90 provides an insulating layer of air for reducing the influence of the carburetor side walls on the temperature of the fuel compartment 88.

As the fuel level in compartment 88 decreases, due to the inclination of lower wall 82, the available surface area for evaporation of the liquid fuel also decreases thereby reducing the evaporation of the fuel during soak while it is draining from compartment 88.

Another embodiment of the float chamber of the carburetor vapor control system of this invention, as shown in FIGURE 8, is provided with a skimming outlet 98 and two small diameter outlets 100 and 102 in its outer side wall to drain liquid fuel from the float chamber during periods of soak. A rectangular plate-like solid spacer member 104 may also be provided to separate the liquid fuel from direct contact with the carburetor side wall. Spacer member 104 divides the float chamber into compartment 110 which holds the liquid fuel therein and into compartment 112 which is always free of fuel and merely provides a spacing layer of air between the liquid fuel and carburetor side wall. In this embodiment the spacer member is provided with a single through-aperture 114 for passing fuel line 116 of the carburetor into the liquid fuel.

As shown in FIGURE 9, the diameters of the outlets 98, 100 and 102 decrease respectively in diameter with outlet 102 being the smallest. This embodiment provides a rapid draining of fuel from the float chamber when the engine is not in operation and further provides substantially complete elimination of direct contact between the carburetor side wall and the liquid fuel in the float chamber. The upper edge of spacer member 104 is at a substantially higher level than skimming outlet 98 so that liquid fuel does not pass into compartment 112. Thermal conduction of heat from the walls of the carburetor into the float chamber occurs principally along the float chamber lower wall.

In this embodiment of my invention the rate of emptying of the float chamber decreases as the fuel level gets below outlet 100. This vertical distribution of small diameter outlets along the carburetor outer wall provides for continuous circulation of large quantities of fuel through the float chamber and out line 22 without the fuel level falling to a level low enough to affect the operation of the engine. The circulating fuel conducts heat from the walls of the float chamber and thereby reduces the overall fuel temperature therein.

It has been found best to maintain about ½ to ⅓ of the original fuel content in the float chamber so that the starting characteristics of the engine are not detrimentally affected. The lower end of feed line 116 is below outlet 102 so that fuel may be fed to the venturi during start-up before the fuel pump has refilled the float bowl. This is particularly advantageous with automobiles using mechanical fuel pumps which require starter actuation to commence pumping.

The vapor recovery system of this invention may also be provided with a one-way valve as shown in FIGURE 10 to take advantage of the reversibility of the adsorption of hydrocarbons in carbon trap 134 (FIG. 4). When a clear air stream or lean hydrocarbon-air mixture is passed over the adsorbing surfaces of the carbon trap material, desorption of some of the absorbed hydrocarbons occurs. The system of the present invention may be adapted to utilize this reversible process so that vapors flowing through line 33 are relatively lean in hydrocarbons and rich in fresh air. This lean mixture desorbs some of the hydrocarbons adsorbed by the trap from prior excessive tank or carburetor emissions thereby conditioning the cannister adsorbent material for adsorbing hydrocarbons from subsequent excessive emissions.

The desorption of hydrocarbons from the adsorbent surfaces of the carbon trap material may be effected by utilizing a one-way valve in a vent line (not shown) or by the use of a modified gas cap 130 as shown in FIGURE 10. This cap may be used in place of the solid nonvented gas cap 32 shown in FIGURE 3. Cap 130 includes a centrally located antisurge valve 132 which permits fresh air to be drawn in from the atmosphere when there is a sufficiently low pressure in fuel tank 28 but does not permit hydrocarbon vapors to escape from the tank into the atmosphere. Basically, valve 132 comprises a resilient ball 133 which seats against an upwardly conical seat 136 in the gas cap to provide a fluid tight seal. Ball 133 is biased into seating position by means of a coil spring 140 axially disposed in a cylindrical bore of cap 130. Spring 140 may be retained in position by means of the lower small diameter portion of a stepped bore in a thermally expansible disc 142 which is resiliently mounted on cap 130 by means of a pair of bolts 144 and coil springs 146. Bolts 144 are adjustably mounted in threaded bores 150 of cap 130 by their threaded end portions 152. Disc 142 may be made from any sufficiently strong material having a high thermal coefficient of expansion. Rather than having a stepped bore on the disc, spring 140 may be maintained in place by a small bored washer (not shown) mounted beneath disc 142 on bolts 144.

When the induction system of the internal combustion engine is drawing vapors from fuel tank 28 and thereby creating a low pressure region in the fuel tank, atmospheric pressure causes ball 133 to move downwardly against the bias of coil spring 140 thereby unseating ball 133 from seat 136 allowing fresh air to be drawn into the gas tank from the atmosphere. Normally, the coil spring tension is adjusted so that a relatively slight vacuum of about 2 to 3 inches of water is sufficient to cause ball 133 to be pushed away from its seating position by atmospheric pressure, opening the fuel tank to purging fresh air. When the temperature in tank 28 increases, thermal element 142 expands drawing coil spring 140 downwardly away from seat 136. While the expansion of element 142 is insufficient to unseat ball 133 from its seating position, this expansion does reduce the spring tension so that an even smaller reduction in pressure in the tank is sufficient to unseat the ball. Thus, at high temperatures, an even slighter vacuum created by the induction system of the engine will open the tank to atmosphere and draw in purging air. The additional air, drawn in through cap 130, passes through line 33 and carbon trap 134 thereby increasing desorption of adsorbed hydrocarbons from the trap. At higher operating temperatures, greater amounts of fuel are evaporated. Therefore it is necessary that desorbing occur as soon as possible after a period of high temperature vapor emission. Thermal element 146 assures that, at higher temperatures, a very slight vacuum in the fuel tank will open valve 130 and begin the flow of fresh purging air through the system to desorb hydrocarbons from the trap thereby reactivating it.

This occasional desorption of hydrocarbons from the adsorbent surfaces with either a one-way valve drawing air directly from the atmosphere or the valved fuel tank cap drawing air through the vapor recovery line 26, increases the trap longevity and maintains a substantially constant level of hydrocarbon in the recycle vapors entering the carburetor. The longevity of the carbon trap is also dependent on the adsorbent material used therein, the size of the trap used and the vapor emissions of the system.

Normally, even without occasional desorption of the hydrocarbons, the efficiency of activated carbon-carbon traps remains high until about 20 percent by weight carbon has been adsorbed at which time their efficiency drops off rapidly. Additional benefit may be obtained, in the system of this invention, from the carbon traps by including two or more in series to assure adsorption of all excessive light hydrocarbon emissions by preventing saturation of the traps before desorption. The initial trap of such a series adsorbs all of the light hydrocarbons in the line until it becomes substantially saturated wherein it decreases in efficiency. The next trap in the direction of gaseous flow then takes over the adsorption process and so on until the initial trap is reactivated by desorption.

A flame arrester 154 may be positioned in fresh air line 35 adjacent air cleaner 16 (see FIGURE 4) to prevent flame propagation into the vapor recovery system and the crankcase through fresh air line 35. A flame arrester 154 of the type shown in my U.S. Patent No. 3,237,617 which prevents flame propagation in one direction but permits vapor flow in the other direction may conveniently be employed for this purpose.

Figure 11:
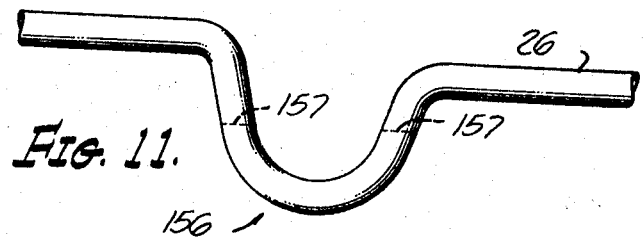
FIGURE 11 is an enlarged view of a portion of the recovery line 26 connecting the condenser of my vapor recovery system with the fuel tank.

As shown in FIG. 3, the vapor recovery system of this invention may be further provided with two protective devices for preventing liquid fuel or vapors from flowing from fuel tank 28 into the carburetor float chamber through line 22. This is accomplished by providing a downwardly bent portion 156 in vent line 26 between carburetor 14 and fuel tank 28. The lowest point in bent portion 156 is lower than condenser 24 but higher than fuel tank 28. Condensate draining from condenser 24 back to fuel tank 28 lies in bent section 156 as shown in FIGURE 11 in dotted lines 157. This trapped liquid prevents vapors from passing through line 26 back into condenser 24 from the fuel tank until sufficient fuel vapor pressure exists in the fuel tank to overcome the liquid head 157, as for example, more than 4–8 inches of water. Condensate, however, can pass from condenser 24 through line 26 and through the bent section back into the fuel tank since line 26 on the fuel tank side of the bent section is lower than on the condenser side of section 156.

Figure 12:
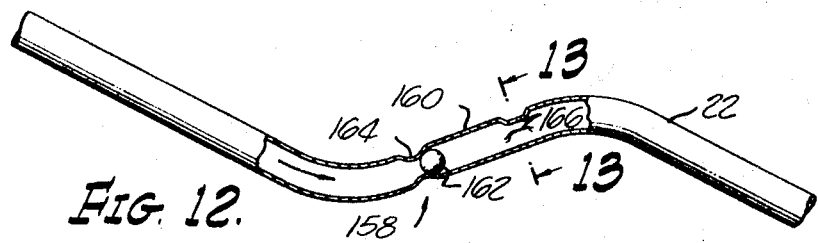
FIGURE 12 is an enlarged view, partially in section, of a portion of the line 22 connecting the carburetor float chamber of FIGURE 3 with a fuel condenser.

To prevent liquid fuel flow from the fuel tank into the float chamber through lines 26, condenser 24, and line 22 when the vehicle is positioned so that the fuel tank is at a higher level than the carburetor float chamber, as for example, when the vehicle is parked on a steep downgrade, a one-way valve 158 is provided in another bent portion 160 of line 22. As best shown in FIGURE 12, valve 158 comprises a resilient ball 162 and a crimp section 164 of tubing 22 against which ball 162 can seat in fluid tight relation. The ball is normally biased into its seating position by gravity. Liquids or gases flowing from right to left against the direction of the arrow of FIGURE 12 force the ball into tighter seating relation and are prevented from flowing into the float chamber. A series of indentations such as dimples 166 shown in FIGURE 13, may be provided on the condenser side of the valve to prevent the ball from being carried into the condenser by liquids and gases flowing from the carburetor float chamber.

Figure 13:
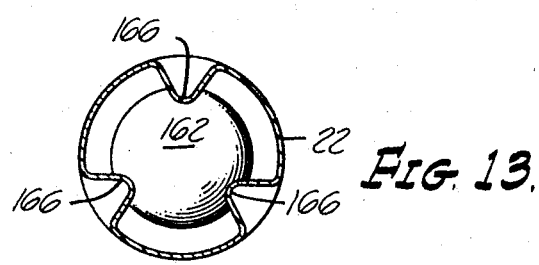
FIGURE 13 is an enlarged sectional view taken substantially along line 13—13 of FIGURE 12 showing more clearly the valve portion of FIGURE 12.

By reducing the fuel level or eliminating fuel entirely from the float chamber during periods of soak, a simple relatively inexpensive means is provided for controlling evaporative losses from the carburetor float chamber. The protective devices incorporated into the system of this invention, as shown in FIGURES 11 through 13, further provide positive control of the carburetor vapors without flow of vapor or liquid from the fuel tank to the carburetor through the vapor recovery system of this invention.

FIGURE 14 shows another embodiment of the vapor recovery system of our invention for use with automotive vehicles having the fuel tank mounted higher than or about the same height as the carburetor.

The vapor recovery system as shown in FIGURE 14 includes a condenser 224 which is connected by line 222 to the float chamber 220 of a carburetor 214. A fuel tank 228 is mounted above condenser 224 and communicates therewith through a line 226. The fuel tank 228 is also connected to float chamber 220 by means of fuel line 230 which includes a fuel pump 231.

Gasoline fumes and vapors drawn from the float chamber through line 222 are passed into condenser 224 (FIGURE 14) where the vapors are partially condensed. Condenser 224 includes a condensate drain line 232 connected to the bottom thereof so that liquids condensing in condenser 224 are returned through line 232 to the fuel line 230. Preferably, the carburetor vent line 222 is connected to the upper portion of the condenser 224.

A conventional one-way valve 236, e.g. a float valve, is positioned in line 232. When line 232 above valve 236 is filled with liquid fuel condensate and only a small amount of condensate is on the bottom of condenser 224, valve 236 opens and the liquid fuel from condenser 224 is drawn into the current of fuel flowing through line 230. When the engine is running, fuel line 230 is under partial vacuum, and thus fuel in condenser 224 is pulled through line 232 past valve 236. The condensed fuel vapors then are pumped by fuel pump 231 through line 230 back into the carburetor float chamber.

Line 232 may be formed from a copper tubing or a molded plastic having the valve inserted therein. One-way valve 236 may be an integral part of the tubing or may be attached thereto as by threaded fittings (not shown). Valve 236 prevents excess air from being drawn into the fuel line thereby reducing the efficiency of fuel pump 231 or otherwise interfering with the operation of the engine. The one-way valve also prevents flow of fuel from fuel line 230 upwardly into condenser 224.

The gas cap 246 in the rear of the automobile is a solid non-venting cap, as described with respect to FIGURE 3, which effectively prevents the escape of vapors from the system through the fuel fill pipe 247.

The condenser 224 may be appropriately vented as described with respect to FIGURE 3, through a condenser vent line 243.

EXAMPLE

Test automobiles C (a 1966 V-8 Chevrolet, 283 c.i.d. with manifold air injection) and F (a 1968 V-8 Ford 302 c.i.d. with "Imco"—improved combustion system), employing vapor recovery systems of the type shown in FIG. 1 were tested and the evaporative emissions from each automobile reduced to less than one gram per test which when evaluated by the proposed Federal test procedure is equivalent to a reduction of more than 95 percent.

The reduction of the evaporative losses on test cars C and F is shown in Table I. It can be noted from these data that evaporative losses for test car C were nil during the diurnal soak but a small amount of loss occurred during hot soak. Small losses from car F occurred both during the diurnal and hot soak cycles.

In order to determine the relative amount of evaporated fuel escaping through external vents of automobiles C and F while not employing the vapor recovery system of FIG. 1, the quantity of fuel vaporized during hot soak was calculated from the V/L (vapor-liquid ratio) characteristics of the fuel, the carburetor bowl temperature and the bowl capacity. The results were then compared with measured losses from the external vents. The relative percentages venting externally for each of the two cars appears in Table II.

TABLE II.—CARBURETOR SOAK LOSSES VENTING EXTERNALLY

| Test Car | Temperature, °F. | | Bowl Capacity, Ml. | Hydrocarbon Loss | | | |
|---|---|---|---|---|---|---|---|
| | Ambient | Carburetor Bowl (max.) | | Total Evap.[1] (Calc.) | | Recovered[2] | |
| | | | | Percent | Ml. | Ml. | Percent |
| C | 76 | 152 | 73 | 13.9 | 10.2 | 8.0 | 79 |
| F | 85 | 156 | 90 | 17.0 | 15.3 | 5.0 | 33 |

[1] Calculated from V/L data for fuel.
[2] Recovered from external vent during 1 hour soak period.

An inspection of the data reveals that 79 percent of the carburetor hot soak losses from car C vented externally whereas only about 33 percent of those from car F vented externally. Fuel pump and carburetor design variables may have affected this percentage. The carburetor on test car C had less internal venting capacity than car F. Furthermore, the fuel line pressure was not relieved during soak which may have contributed to after fill and higher losses. Conversely, the carburetor on that test car F had approximately twice the internal venting capacity and bleed back orifices in the fuel pump relieved fuel line pressure within a period of three to four minutes after turning off the ignition. It was determined that substantial loss of fuel vapors through the air cleaner during hot soak did not occur. Carburetor losses during vehicle operation were minimal since most carburetor external vents are closed during operation which prevents loss to the atmosphere. For those vehicles equipped with carburetors which are vented externally during operation, the capacity of the internal venting and the slightly negative bowl pressures are usually sufficient to preclude the escape of vapors externally.

It was found that condensation will occur if a substantial temperature differential, e.g. 50° F. or more, exists between the unit in which vaporization occurs and the point of condensation. Of the various test cycles observed a temperature differential of this magnitude normally occurs only during hot soak, i.e. only during hot soak was there a sufficient temperature differential between the separator and the fuel system components for condensation to occur.

As can be seen from the foregoing description, this invention provides means for controlling the fuel vapors normally lost by evaporation to the atmosphere from the carburetor and fuel tank and such losses are controlled both during operation of the internal combustion engine and during soak.

TABLE I.—REDUCTION OF EVAPORATION LOSSES

| | Test Car C—Loss, gms. | | | | Test Car F—Loss, gms. | | | |
|---|---|---|---|---|---|---|---|---|
| | Tank | Carburetor | Air Cleaner Inlet | Total | Tank | Carburetor | Air Cleaner Inlet | Total |
| Without V-V-R System:[1] | | | | | | | | |
| Diurnal Soak | 10.2 | 0.4 | 0 | 10.6 | 11.4 | 0.5 | 0 | 11.9 |
| Vehicle Operation | 5.8 | | | 5.8 | 5.4 | | | 5.4 |
| Hot Soak | 0.5 | 5.0 | 0 | 5.5 | 2.4 | 4.1 | Trace | 6.5 |
| Total | | | | 21.9 | | | | 23.8 |
| With V-V-R System: | | | | | | | | |
| Diurnal Soak | | | | 0 | 0 | | | 0.2 | 0.2 |
| Vehicle Operation | | | | | | | | |
| Hot Soak | | | | 0.4 | 0.4 | | | 0.2 | 0.2 |
| Total | | | | 0.4 | | | | 0.4 |

[1] V-V-R System=Vehicle Vapor Recovery System of the type shown in FIG. 1.
NOTE.—Ambient Temperature=85° F.; Test Procedure=Proposed Federal Evaporation Loss Test.

Many modifications and variations of the invention, as hereinbefore set forth, may be made without departing from the spirit and scope thereof and therefore only such limitations should be imposed as are indicated in the appended claims.

I claim:
1. An improvement in an internal combustion engine powered vehicle adapted to minimize evaporative fuel losses, wherein an unvented fuel system is provided, and fuel is withdrawn from a fuel tank to a carburetor which supplies an air-fuel mixture for combustion in said engine, comprising in combination:
(a) a fuel storage receptacle thermally insulated from the heat of the engine and exhaust system so that during the soak period a temperature gradient sufficient to effect partial fuel condensation in said receptacle exists between said receptacle and said carburetor,
(b) a vent line between said carburetor float chamber and said receptacle through wihch liquid fuel and fuel vapors can flow from said float chamber to said receptacle for separation during engine operation and condensation during said soak period,
(c) a fuel tank vent line between said receptacle and said fuel tank through which said fuel separated and said fuel condensed in said receptacle may flow to said fuel tank,
(d) means including a line from said receptacle to said engine crankcase for venting said receptacle into said crankcase to permit storage of vapors from said fuel system in said crankcase during the engine soak period, said crankcase being at a lower pressure than said condenser and said fuel system during said soak period whereby said vapors are drawn into said crankcase, and
(e) means including a closed crankcase ventilation system for subsequent engine consumption of said vapors stored in said crankcase.

2. The apparatus of claim 1 wherein said fuel storage receptacle is in thermal communication with an area substantially cooler than said engine.

3. The apparatus of claim 1 wherein said fuel storage receptacle is positioned below said carburetor and above said tank whereby fuel may flow by gravity from said carburetor to said receptacle through said first vent line and from said receptacle to said tank through said second vent line.

4. The apparatus of claim 1 wherein said vapor consumption means is a conduit from said crankcase to the clean air side of the carburetor air cleaner.

5. The apparatus of claim 1 including means for subjecting said condenser to a slight vacuum.

6. The apparatus of claim 1 wherein said carburetor vent line connects to said float chamber just above the desired fuel level.

7. Apparatus as defined in claim 1 including means in said receptacle venting means for adsorbing lightweight hydrocarbon vapors from the noncondensed vapors passed to said crankcase.

8. Apparatus as defined in claim 7 wherein said adsorbing means comprises activated carbon disposed in said vapor returning means.

9. Apparatus as defined in claim 8 wherein said adsorbing means is detachably mounted in said vapor returning means for easy removal and replacement thereof.

10. Apparatus as defined in claim 7 wherein said adsorbing means is so disposed in said system that lean air-hydrocarbon vapor mixtures periodically pass over its surface and desorb previously absorbed hydrocarbons thereby conditioning said adsorbing means for subsequent excessive hydrocarbon emissions.

11. The apparatus of claim 1 wherein said carburetor float chamber includes means for separating said liquid fuel from direct contact with the walls of said carburetor.

12. The apparatus of claim 1 including means for removing fuel from said carburetor through said vent line comprising a plurality of increasingly smaller diameter outlets disposed vertically along a wall of said carburetor float chamber with the smallest diameter outlet being adjacent the lower portion of said chamber.

13. Apparatus as defined in claim 12 further including means for preventing liquid flow from said fuel tank to said carburetor float chamber through said float chamber outlet comprising a bent portion in said tubing having a seat surface in the lower portion of said bent portion and a movable sealing member in said tubing for fluid tight engagement with said seat, said sealing member being biased by the force of gravity into fluid tight engagement with said seat.

14. The apparatus of claim 1 including:
means in said carburetor float chamber for emptying a portion of the fuel therefrom into said receptacle and for reducing the fuel level therein when said engine is shut off;
means separating the fuel in said float chamber from the walls of said carburetor for reducing the thermal effect of said carburetor walls on the liquid in said float chamber and thereby reducing evaporation therefrom;
one-way valve means intermediate said float chamber and said receptacle for blocking liquid flow from said receptacle to said float chamber; and
means in said system for causing flow of liquid fuel from said carburetor float chamber to said fuel tank through said receptacle.

15. A carburetor as defined in claim 13 wherein said means for reducing contact comprises a plate mounted in said float chamber and dividing said float chamber into a liquid fuel containing first compartment and a second compartment intermediate said first compartment and the outer surface of said barrel.

16. The apparatus of claim 1 wherein said receptacle is mounted at a lower level than said carburetor and said fuel tank whereby fuel vapors from said carburetor and said fuel tank can pass by gravity into said receptacle, and wherein the lowest point of the fuel line connecting said fuel tank with said carburetor is at a lower level than said receptacle; and including means connecting said receptacle with said fuel line for enabling condensate in said receptacle to flow from said receptacle into said fuel line.

17. In an unvented fuel system adapted to minimize evaporated losses from an internal combustion engine powered vehicle, wherein fuel is withdrawn from a fuel tank to a carburetor which supplies an air-fuel mixture for combustion in said engine, the improvement comprising:
a conduit external to said engine, between said carburetor float bowl and the vapor space of said fuel tank,
means including a line from said conduit to said engine crankcase, for venting said conduit into said engine crankcase to permit storage of vapors from said fuel system in said crankcase during the engine soak period, said vapors from said fuel system passing into said crankcase during said soak period in response to a pressure drop between said fuel system and said crankcase during said soak period, and
means including a closed crankcase ventilation system for subsequent engine consumption of said vapors stored in said crankcase.

18. The system of claim 17 wherein said vapor consumption means is a conduit from said crankcase to the clean air side of the carburetor air cleaner.

19. The system of claim 17 including means at said bowl for withdrawing fuel into said conduit at the skim line.

20. The apparatus of claim 17 including:
means for preventing fuel vapors from flowing from said fuel tank into said carburetor through said external conduit means, and
means disposed intermediate said carburetor and said fuel tank and in fluid communication therewith for condensing fuel vapors passing from said carburetor to said fuel tank.

21. The apparatus of claim 17 including:
means for circulating fuel from said fuel tank to said carburetor float chamber for use in operation of said internal combustion engine;
means disposed in said external conduit for preventing fluids from passing through said conduit from said fuel tank into said carburetor float chamber; and
receptacle means disposed in said conduit intermediate said carburetor and said fuel tank and in fluid communication therewith for condensing fuel vapors passing from said carburetor float chamber to said fuel tank.

22. The apparatus of claim 17 wherein said external conduit comprises means in said float chamber for skimming off excess liquid fuel during operation of said engine and including:
means in said float chamber for reducing the thermal effect of the walls of said carburetor on the liquid in said float chamber,
means in said float chamber for removing fuel therefrom when said engine is not in operation, and
means mounted on said vehicle and connected to said removing means for returning said removed fuel to said fuel tank.

23. The system of claim 22 wherein said reducing means comprises a plate member so disposed in said fuel chamber that the fuel therein does not come into direct contact with the walls of said carburetor.

24. A carburetor as defined in claim 21 wherein said second compartment has an opening in the lower portion thereof for draining liquid fuel from said second compartment out of the carburetor and said plate has an opening therein for draining liquid fuel from said first compartment into said second compartment.

25. The apparatus of claim 17 including a fuel expansion chamber in fluid communication with said external conduit, into which fuel forced from said tank may be stored.

References Cited

UNITED STATES PATENTS

| | | | |
|---|---|---|---|
| 2,454,974 | 11/1948 | Mennesson | 261—36.1 |
| 2,773,492 | 12/1956 | Klemm | 123—136 |
| 2,846,203 | 8/1958 | Voss et al. | 261—36 |
| 2,894,736 | 7/1959 | Wentworth | 261—72 |
| 2,965,086 | 12/1960 | Gregory et al. | 123—136 |
| 2,986,133 | 5/1961 | Mattson | 123—136 |
| 3,001,519 | 9/1961 | Dietrich et al. | 123—136 |
| 3,048,157 | 8/1962 | Gregory et al. | 123—136 |
| 3,093,124 | 6/1963 | Wentworth | 123—136 |
| 3,162,235 | 12/1964 | Capehart | 158—36.3 |
| 3,172,348 | 3/1965 | Berg | 98—2 |
| 3,221,724 | 12/1965 | Wentworth | 123—136 |
| 3,241,494 | 3/1966 | Johnson | 103—150 |

LAURENCE M. GOODRIDGE, Primary Examiner.

U.S. Cl. X.R.

123—120

PO-1050
(5/69)

UNITED STATES PATENT OFFICE
CERTIFICATE OF CORRECTION

Patent No. 3,448,731          Dated    June 10, 1969

Inventor(s)          Harold D. Daigh

It is certified that error appears in the above-identified patent and that said Letters Patent are hereby corrected as shown below:

Column 3, line 59, insert --four cycle internal combustion engine--. Column 4, line 28, delete "of" and insert --or-- in lieu thereof. Column 5, lines 44-49, delete the sentence "As the fuel in the float chamber 18 rises, ...to pump fuel into the float bowl 18." Column 6, line 72, after the period insert the following sentence: --As the fuel level in the float chamber 18 rises, the bouyancy of the float causes the float linkage to shut off the fuel pump and as the fuel level drops the float 60 drops and in so doing starts the fuel pump to pump fuel into the float bowl 18.--. Column 7, line 21, the numeral "60" should read --66--. Column 12, line 25, delete "that". Column 13, line 15, the word "wihch" should read --which--. Column 14, line 43, delete "evaporated" and insert --evaporative in lieu thereof.

SIGNED AND
SEALED
MAY 26 1970

(SEAL)
Attest:

Edward M. Fletcher, Jr.
Attesting Officer

WILLIAM E. SCHUYLER, JR.
Commissioner of Patents